United States Patent Office 2,951,100
Patented Aug. 30, 1960

2,951,100

HALOMETHYLATION

Chester E. Adams and Delbert H. Meyer, Highland, Ind., assignors to Standard Oil Company, Chicago, Ill., a corporation of Indiana No Drawing. Filed Feb. 28, 1957, Ser. No. 642,974

10 Claims. (Cl. 260—651)

This invention relates to the halomethylation of aromatic compounds. In a particular aspect it relates to an improved process whereby two or more halomethyl side chains can be attached to the nucleus of an aromatic compound.

Numerous methods for the halomethylation of aromatic compounds are known. In general, these involve the reaction of the aromatic compound with formaldehyde and a hydrogen halide or the equivalent thereof, such as a halomethylether. Although these known methods are satisfactory in most cases for introducing one halomethyl group onto the ring of the aromatic compound, they are in general ineffective for producing polyhalomethyl derivatives. The presence of a halomethyl radical on the nucleus inhibits the reactivity of the compound. As a result, further halomethylation of an aromatic compound containing a nuclear halomethyl substituent becomes increasingly difficult. Known methods are either completely ineffectual or require excessively high temperatures and/or long reaction times, leading to the formation of undesirable condensation products.

It is an object of this invention to provide an improved process for the halomethylation of aromatic compounds. Another object is to provide a method for attaching two or more halomethyl groups to the nucleus of an aromatic compound. A further object is to provide a process for halomethylating aromatic compounds which are already nuclearly substituted with halomethyl radicals. Other objects and advantages of our process will be apparent to those skilled in the art from the following description.

In accordance with our invention, one or more chloromethyl or bromomethyl groups can be attached to the nucleus of an aromatic compound, or in a more particular aspect, an aromatic compound containing nuclear halomethyl groups can be further halomethylated, by reacting the compound with formaldehyde or one of its polymeric forms such as paraformaldehyde or trioxymethylene in the presence of a stoichiometric excess of HCl or HBr under a pressure exceeding about 100 p.s.i. and preferably within the range of about 300 to 1500 p.s.i. Although the process of our invention is applicable to monohalomethylation (i.e., the introduction of only one halomethyl group), and when so used shows an advantage over prior art methods in producing yields of halomethylated products which are higher than those of the prior methods in a much shorter time and in a more reproducible manner, it is particularly valuable for the introduction of multiple halomethyl groups, for which the known methods are ineffective.

For convenience our process will be described with particular reference to chloromethylation of aromatic compounds. It should be understood, however, that it is just as applicable to bromomethylation of these compounds, by the substitution of HBr for HCl whenever the latter is used.

Aromatic compounds suitable for use in our process must contain a replaceable nuclear hydrogen atom for each chloromethyl group which is to be added. Subject to this requirement, our process is applicable to aromatic compounds in general, including those containing two or more benzenoid rings. The preferred aromatic compounds, however, contain not more than two benzenoid rings. Aromatic compounds which can be used include hydrocarbons such as benzene and alkyl benzenes such as toluene, xylene, mesitylene, durene, isodurene, pseudocumene and the like; bicyclic hydrocarbons such as naphthalene, methyl naphthalene and the like; aromatic acids such as benzoic acid and aryl substituted aliphatic acids such as phenyl acetic acid, etc. In a particular aspect of our invention, the starting aromatic compound is nuclearly substituted with one or more chloromethyl groups, such as benzyl chloride and mono- and bis-chloromethyl mesitylene and pseudocumene. Any desired method for producing such chloromethylated aromatic hydrocarbons for use as starting materials in our process can be employed.

Formaldehyde can be supplied to the reaction in aqueous solution (e.g., as formalin) or as a revertible polymer such as paraformaldehyde, trioxymethylene, trioxane, etc. In general, any polymeric form of formaldehyde which reverts to formaldehyde under the process conditions can be used.

The relative quantities of aromatic compound and formaldehyde which are used depend on the degree of chloromethylation which is desired, and on the nature of the aromatic compound. If only one chloromethyl group is to be added, a molar ratio of formaldehyde to aromatic compound of about 1:1 is sufficient. If more than one chloromethyl group is to be added, or if the starting aromatic compound already contains one or more nuclear halomethyl radicals, an excess of formaldehyde should be employed. Generally, molar ratios of formaldehyde to aromatic compound within the range from about 1:1 to about 4:1 are adequate, although in certain cases ratios of 10:1 or greater may be desirable.

In carrying out the reaction a stoichiometric excess of hydrogen chloride must be supplied to the reaction vessel under a pressure in excess of about 100 p.s.i. at the reaction temperature, and preferably within the range of about 300 to 1500 p.s.i. In general, pressures below about 100 p.s.i. result in poor yields of polychloromethylated products and pressures above about 2,000 p.s.i. offer no particular advantage. We have found that the range of pressure between about 300 p.s.i. and 1500 p.s.i., which is the preferred range for the operation of our process, is sufficient for the chloromethylation of most of the aromatic compounds contemplated for use in our invention, although at times it may be desirable to exceed this range.

Suitable temperatures for the operation of our process range from about 0° C. to a maximum of about 125° C., above which decomposition of the product is likely to occur. In general, the higher temperatures should be used when the reaction is one which proceeds only with difficulty, such as the introduction of three chloromethyl groups or the further chloromethylation of a compound which is already polychloromethylated. However, since the use of elevated temperatures results in the formation of undesirable compounds such as diarylmethanes and condensation products, the temperature used should be as low as possible, consistent with the yields desired. In carrying out the reaction, temperature control can be improved if the formaldehyde is exposed to the HCl under pressure before the aromatic compound is added. The reaction between formaldehyde and HCl is exothermic and may produce a temperature surge which should be avoided if close temperature control over the reaction is to be maintained.

Suitable reaction times are likewise dependent on the particular starting aromatic compounds and the product which is desired. We have found that reaction periods of about 1 to 25 hours will yield good results in most cases.

While catalysts are not essential for the operation of the process of our invention, the chloromethylation reaction is sometimes facilitated by the presence of acid-acting catalysts. Zinc chloride is particularly effective for this purpose. Other catalysts which can be used include aluminum chloride, bismuth chloride, zirconium chloride, and stannic chloride.

The chloromethylation reaction can be carried out in either batch or continuous operations. In either case the reactants are charged to a suitable pressure vessel equipped with stirring or other means for obtaining intimate contact of the reactants and with means for temperature control. Temperature control can be improved by contacting the formaldehyde (or polymer thereof) with HCl under pressure in the absence of the aromatic compound. After the resulting temperature surge has subsided, the resultant reaction product (probably chloromethyl ether) is contacted with the aromatic compound in the main reaction vessel in the presence of HCl under pressure, whereupon the chloromethylation reaction takes place. After the reaction has reached the desired degree of completion, which can be determined by any suitable method such as chloride analysis of a sample of the product, the reaction products are discharged from the reactor and separated by suitable means, as by distillation, and unconverted or incompletely connected reactants are recycled.

The following examples serve to illustrate the results which can be obtained following the method of our invention:

*Example 1*

A 250 ml. "Hastelloy B" reaction vessel equipped with magnetic stirring means (Magne Dash) was charged with 15 grams (0.5 mole) of paraformaldehyde and was pressured to 350 p.s.i. with HCl at room temperature. After the resulting temperature surge had subsided, the reactor was depressured and 50 grams (0.37 mole) of durene was added. The reactor was then charged to a pressure of 300 p.s.i. with HCl at room temperature and was heated at 60° C. for one hour. The reactor was then depressured and the product was dissolved in benzene, washed with water, dried over $K_2CO_3$ and distilled. Conversion of durene was 60% to monochloromethyl durene and 15% to bis-chloromethyl durene.

*Example 2*

In a companion experiment run at atmospheric pressure, a one liter three-necked glass flask was charged with 200 grams (1.49 moles) of durene, 58.5 grams (1.95 moles) of paraformaldehyde, and 400 ml. of ethylene chloride, the mixture was heated to 60° C. and HCl was bubbled through for five hours at a rate of 750 ml. per minute for the first hour and 200 ml. per minute for the last four hours. The resultant reaction products were worked up as in Example 1. Conversion of durene was 8.5% to monochloromethyl durene and 4% to bis-chloromethyl durene.

*Example 3*

In a manner similar to that of Example 1, a reaction was carried out with 43.3 grams (0.36 mole) of mesitylene, 54 grams (1.8 moles) of paraformaldehyde and HCl at 540 p.s.i. for 22 hours at 20–25° C. Conversion of mesitylene was 42.5% to bis-chloromethyl mesitylene and 14% to trischloromethyl mesitylene.

*Example 4*

Following the procedure of Example 1, 21.7 grams (0.1 mole) of bis-chloromethyl mesitylene was reacted with 15 grams (0.5 mole) of paraformaldehyde and HCl at a pressure of 1400 p.s.i. for 18 hours at 105° C. Conversion of bis-chloromethyl mesitylene was 91% to tris-chloromethyl mesitylene.

*Example 5*

Following the procedure of Example 1, 54.3 grams (0.43 mole) of benzyl chloride was reacted with 20 grams (0.67 mole) of paraformaldehyde and HCl at 500 p.s.i. for 22 hours at 90–95° C. in the presence of 5.2 grams (0.038 mole) of zinc chloride as a catalyst. Conversion of benzyl chloride was 44% to xylylene dichloride.

*Example 6*

Following the procedure of Example 1, the reaction was carried out using 86.9 grams (0.82 mole) of m-xylene, 24.6 grams (0.82 mole) of paraformaldehyde and HCl at 500 p.s.i. for one hour at 56° C. The resultant conversion was 39% to the monochloromethyl derivative and 24.5% to the bis-chloromethyl derivative.

As can be seen from the above examples, our process is effective in producing mono- and polychloromethyl derivatives of aromatic compounds (Examples 1, 3, and 6) and in further chloromethylating chloromethyl-substituted aromatic compounds (Examples 4 and 5).

A comparison of Example 1, in which HCl was used at a pressure of about 300 p.s.i., with Example 2 at atmospheric pressure shows that the conversion under pressure was approximately five times as great in one hour as under atmospheric conditions in five hours. Example 4 demonstrates the extremely high yields of polychloromethylated products which can be obtained following the method of our invention. In this run, bis-chloromethyl mesitylene, a product normally difficult to chloromethylate further, was converted to the tris-chloromethyl compound in 91% yield, a result which is a further demonstration of the superiority of our process over the methods of the prior art. Using conditions similar to those of Example 4, other bis-chloromethylated compounds, such as bis-chloromethyl pseudocumene, can be converted in good yields to the tris-chloromethyl derivatives.

The process of our invention provides a valuable method for producing reactive chemical intermediates which can be readily converted into chemical products with widely diverse properties and uses. For example, bis-chloromethyl aromatic compounds such as bis-chloromethyl durene can readily be converted to the dicarboxylic acid by hydrolysis followed by caustic oxidation. The resultant dicarboxylic acid can be used for the manufacture of alkyd resins or, after esterification with an alcohol such as isooctyl alcohol, as a plasticizer for resins such as polyvinyl chloride, cellulose acetate and the like.

Although our invention has been described with reference to specific embodiments thereof, the same are given by way of illustration only. Modifications and variations will be apparent from our description to those skilled in the art.

Having described our invention, we claim:

1. A process for attaching at least one chloromethyl radical to the nucleus of bis-chloromethyl mesitylene, which process comprises reacting bis-chloromethyl mesitylene with formaldehyde in the presence of a stoichiometric excess of hydrogen chloride at a temperature in the range of from about 0° to about 125° C. and a pressure within the range of from about 300 to about 1500 pounds per square inch.

2. A process for attaching at least one chloromethyl radical to the nucleus of bis-chloromethyl pseudocumene, which process comprises reacting bis-chloromethyl pseudocumene with formaldehyde in the presence of a stoichiometric excess of hydrogen chloride at a temperature in the range of from about 0° to about 125° C. and a pressure within the range of from about 300 to about 1500 pounds per square inch.

3. A process for substituting one chloromethyl group on the aromatic nucleus of durene, which process comprises reacting durene with formaldehyde in the presence of a stoichiometric excess of hydrogen chloride at a temperature in the range of from about 0° to about 125° C. a pressure above about 100 pounds per square inch.

4. A process for substituting one chloromethyl group on the aromatic nucleus of isodurene, which process comprises reacting isodurene with formaldehyde in the presence of a stoichiometric excess of hydrogen chloride at a temperature in the range of from about 0° C. to about 125° C. and a pressure above about 100 pounds per square inch.

5. A process for substituting one chloromethyl group on the aromatic nucleus of mesitylene, which process comprises reacting mesitylene with formaldehyde in the presence of a stoichiometric excess of hydrogen chloride at a temperature in the range of from about 0° to about 125° C. and a pressure above about 100 pounds per square inch.

6. A process for substituting one chloromethyl group on the aromatic nucleus of pseudocumene, which process comprises reacting pseudocumene with formaldehyde in the presence of a stoichiometric excess of hydrogen chloride at a temperature in the range of from about 0° to about 125° C. and a pressure above about 100 pounds per square inch.

7. A process for attaching at least one halomethyl radical to the hydrocarbon nucleus of an aromatic compound selected from the class consisting of an alkyl benzene and a substituted aromatic hydrocarbon having a plurality of substituents, said substituents being selected from the class consisting of chloromethyl and bromomethyl groups, which process comprises reacting said aromatic compound with formaldehyde in the presence of a stoichiometric excess of a hydrogen halide at a pressure above about 100 pounds per square inch, said hydrogen halide being selected from the class consisting of hydrogen chloride and hydrogen bromide.

8. A process for attaching at least one halomethyl group to the hydrocarbon nucleus of a substituted aromatic hydrocarbon, said halomethyl group being selected from the class consisting of chloromethyl and bromomethyl groups, said substituted aromatic hydrocarbon being an aromatic hydrocarbon having a plurality of nuclear substituents selected from the class consisting of chloromethyl and bromomethyl groups, which process comprises reacting said substituted aromatic hydrocarbon with formaldehyde in the presence of a stoichiometric excess of hydrogen halide selected from the class consisting of hydrogen chloride and hydrogen bromide at a temperature in the range of from about 0° to about 125° C. and a pressure above about 100 pounds per square inch.

9. A process for substituting a halomethyl group on the aromatic nucleus of an alkyl benzene, which process comprises reacting an alkyl benzene with formaldehyde in the presence of a stoichiometric excess of a hydrogen halide selected from the group consisting of hydrogen chloride and hydrogen bromide at a temperature in the range of from about 0° to about 125° C. and a pressure above about 100 pounds per square inch, said halomethyl group being selected from the class consisting of chloromethyl and bromomethyl groups.

10. The process of claim 9 wherein the reaction is carried out in the presence of a catalyst comprising zinc chloride.

References Cited in the file of this patent

FOREIGN PATENTS

| 911,132 | Germany | May 10, 1954 |
| 937,647 | Germany | Jan. 12, 1956 |

OTHER REFERENCES

Rhoad et al.: Jour. Am. Chem. Soc.," vol. 72, pp. 2216–19 (1950).